(12) United States Patent
Horst

(10) Patent No.: US 7,249,657 B2
(45) Date of Patent: Jul. 31, 2007

(54) WHEELCHAIR AND ONE-PIECE MOLDED BRAKING SUPPORT WHEEL THEREFOR

(76) Inventor: Darrin J. Horst, 13800 75th Ave. North, Seminole, FL (US) 33776

( * ) Notice: Subject to any disclaimer, the term of this patent is extended or adjusted under 35 U.S.C. 154(b) by 45 days.

(21) Appl. No.: 11/247,765

(22) Filed: Oct. 11, 2005

(65) Prior Publication Data
US 2006/0086574 A1  Apr. 27, 2006

Related U.S. Application Data

(60) Provisional application No. 60/622,305, filed on Oct. 26, 2004.

(51) Int. Cl.
*B62B 5/04* (2006.01)
(52) U.S. Cl. .................... 188/2 F; 188/325
(58) Field of Classification Search ............. 188/2 F, 188/74, 325, 328, 329, 330
See application file for complete search history.

(56) References Cited

U.S. PATENT DOCUMENTS

| 4,211,309 | A  |   | 7/1980  | Ruggiero |
| 4,226,413 | A  |   | 10/1980 | Daughterty |
| 4,641,847 | A  |   | 2/1987  | Busse |
| 4,907,794 | A  |   | 3/1990  | Rose |
| 5,020,560 | A  |   | 6/1991  | Turbeville |
| 6,123,128 | A  | * | 9/2000  | Ringenbach ............ 152/47 |
| 6,158,757 | A  |   | 12/2000 | Tidcomb |
| 6,631,925 | B1 |   | 10/2003 | Lawson, Jr. |
| 7,124,858 | B2 | * | 10/2006 | Ikegami et al. ......... 188/2 F |

* cited by examiner

*Primary Examiner*—Melanie Torres
(74) *Attorney, Agent, or Firm*—Charles J. Prescott

(57) ABSTRACT

A molded braking and support wheel assembly for a multi-wheeled wheelchair for a handicapped person. The wheel assembly includes a braking support wheel molded as a single unit of plastic or plastic-like material having concentric components including a tire receiving rim, a wheel bearing and brake assembly receiving hub, and spaced wheel spokes substantially radially extending between the hub and rim. A ring or band-shaped metal brake drum is also molded as a unit into the hub, the brake drum having a generally cylindrical inner braking friction surface and plastic-interlocking outer surface features which permanently interlock with the plastic material when the braking support wheel is mold formed. The plastic-interlocking outer features are molded with the hub into a single unit with the support wheel to secure the brake drum from relative movement in the hub. The brake drum defines a generally cylindrical cavity for operatively receiving the brake assembly. The hub includes a wheel bearing cavity coaxial with said brake drum for receiving spaced wheel bearings positioned therein.

4 Claims, 9 Drawing Sheets

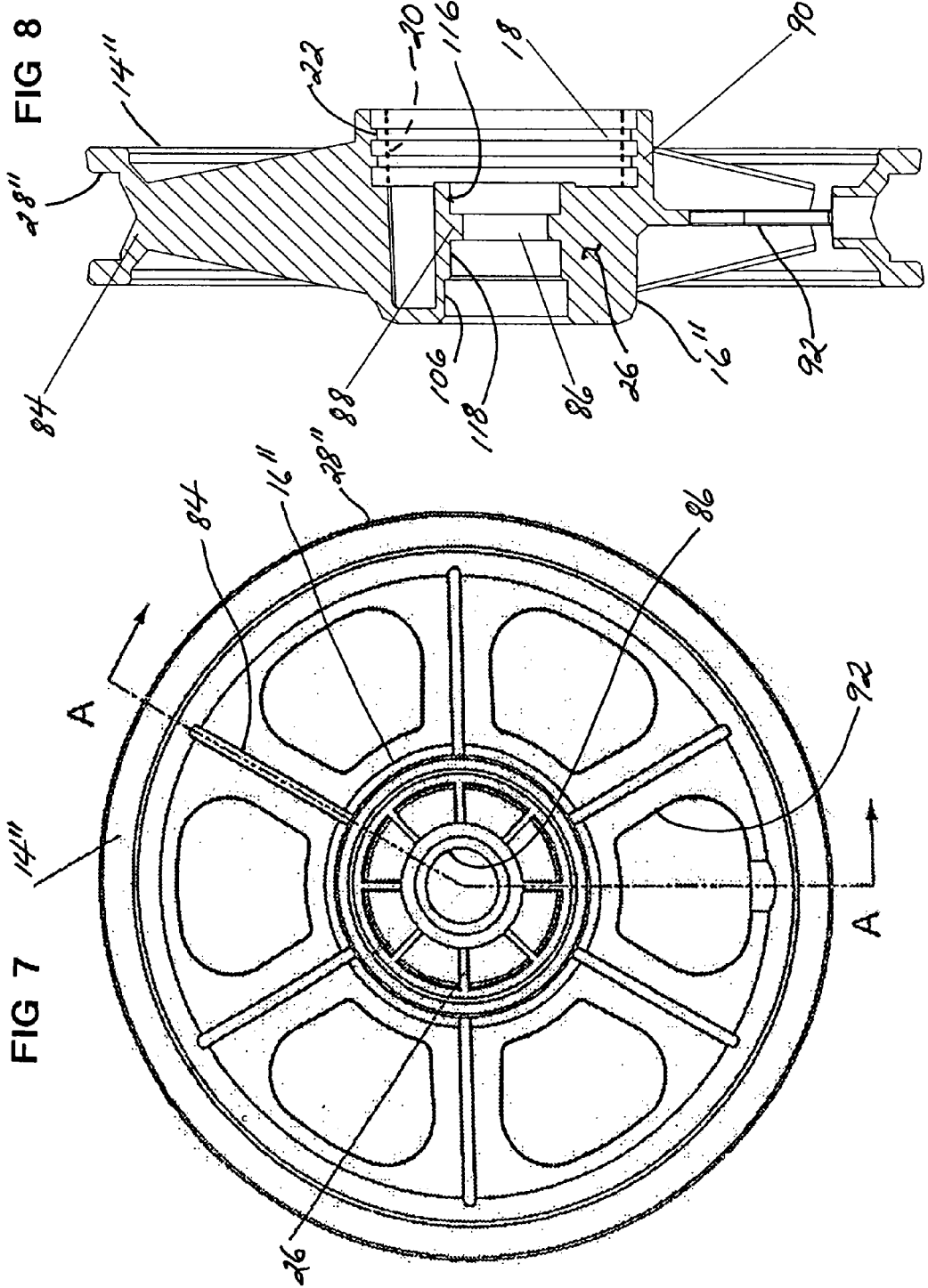

WHEELCHAIR AND ONE-PIECE MOLDED BRAKING SUPPORT WHEEL THEREFOR

CROSS-REFERENCE TO RELATED APPLICATIONS

This application is a continuation-in-part of provisional patent application 60/622,305 filed Oct. 26, 2004.

STATEMENT REGARDING FEDERALLY SPONSORED RESEARCH OR DEVELOPMENT

Not applicable

INCORPORATION-BY-REFERENCE OF MATERIAL SUBMITTED ON A COMPACT DISC

Not applicable

BACKGROUND OF THE INVENTION

1. Field of the Invention

This invention relates generally to wheelchairs for the handicapped, and more particularly to a one-piece molded wheel support wheel formed as a unit for supporting and braking the wheelchair.

2. Description of Related Art

Manually propelled wheelchairs having two smaller castered front wheels and two larger rear wheels are well known. These assistive devices are utilized by users which are physically impaired individuals unable to walk or who find walking difficult and are typically propelled by the user. Such wheelchairs require periodic immobilization and stabilization thereof as determined by the user or attendant and are therefore equipped with a hand-actuated brake assembly (typically one per each braking support wheel) attached to a frame member of the wheelchair frame assembly adjacent the wheelchair seat allowing the user or attendant to selectively move a hand operated lever of the brake assembly to engage or disengage a friction braking member in the form of a bar or plate which presses against the outer periphery of each corresponding tire of the braking support wheels of the wheelchair.

However, due to wheel wear, moisture, dirt, oil and other wheel periphery surface modifying debris or contaminants, the limited pressure exerted by the friction member thereagainst will vary greatly and thus correspondingly affect the degree of braking friction for immobilization of the wheelchair. Should the frictional force between the outer periphery of the rear wheel and the friction member be compromised and reduced, unexpected movement of the wheelchair may be experienced.

A more efficient brake mechanism has been incorporated into battery powered motorized three-wheeled scooters which provide motorized personal transportation for a seated user. These motorized scooters typically include spaced apart coaxially mounted rear wheels, one or both of which serve as a driving wheel connected to the battery powered motor mounted on the scooter carriage and a steerable front wheel which includes a wheel housing supporting a single front wheel and a brake mechanism having a tightenable brake band and drum arrangement. However the steerable front wheel of such power scooters is typically supported between spaced downwardly extending ears or plates of the wheel housing such that the entire wheel and brake mechanism are held on an elongated mounting shaft connected between the lower ears of the wheel housing itself.

The present invention replaces the conventional support wheel and corresponding wheel perimeter brake engaging members with a one-piece molded braking and support wheel which includes a molded-in brake drum wheel operably receiving a brake assembly. Substantially greater consistent braking and immobilization are achieved by providing a brake and support wheel mold formed more efficiently as a unit of wheelchairs and which is substantially less impervious to conditions of tire wear, moisture, dirt, oil and other debris which would typically collect on the outer perimeter surface of the wheel tire.

BRIEF SUMMARY OF THE INVENTION

This invention is directed to a molded braking and support wheel assembly for a multi-wheeled wheelchair for a handicapped person. The wheel assembly includes a braking support wheel molded as a single unit of plastic or plastic-like material and having a tire receiving rim, a wheel bearing and brake assembly receiving hub, and spaced wheel spokes substantially radially extending between the hub and rim. A ring-shaped metal brake drum is molded as a unit into the hub, the brake drum having a plastic-interlocking outer surface and a generally cylindrical inner braking friction surface. The plastic-interlocking outer surface is molded into said hub as a single unit with the support wheel to secure the brake drum from relative movement in the hub. The brake drum defines a generally cylindrical cavity for operatively receiving a brake assembly, the hub including a wheel bearing cavity coaxial with said brake drum for receiving a wheel bearing positioned therein.

It is therefore an object of this invention to provide a wheelchair for an ambulatory-impaired user which includes a substantially more reliable brake mechanism for selective immobilization of the wheelchair.

Still another object of this invention is to provide an improved wheel brake mechanism for wheelchairs which is uniquely incorporated into a new one-piece molded brake and support wheel having a molded-in rigid metal brake drum which is ready to receive the brake assembly.

Yet another object of this invention is to reduce the amount of rear wheel tire tread wear caused by current brake lever engagement thereagainst to brake a wheelchair.

Still another object of this invention is to provided more consistent braking function of the brake assemblies of a wheelchair along with substantially less brake wear and significantly less adjustment thereof.

In accordance with these and other objects which will become apparent hereinafter, the instant invention will now be described with reference to the accompanying drawings.

BRIEF DESCRIPTION OF THE SEVERAL VIEWS OF THE DRAWING(S)

FIG. 7 is a side elevation view of the braking support wheel of FIG. 6.

FIG. 8 is a section view in the direction of arrows A-A in FIG. 7.

LIST OF COMPONENTS

10—manually propelled wheelchair assembly
12—braking support wheel assembly
14—braking support wheel
16—molded wheel hub
18—brake drum
20—drum friction surface
22—grooved plastic-interlocking outer surface
24—brake shoe support aperture
26—hub rib
28—tire receiving rim
30—brake assembly
32—brake support plate
34—brake friction shoe
36—brake shoe actuator surface
38—brake shoe support shaft
40—motion transfer arm
42—brake cam
44—support arm
46—threaded adjuster
48—hand grip
50—brake actuator lever
52—brake plate anti-rotation aperture
54—debris flange
56—adjuster support flange
58—core wire
60—wheelchair frame assembly
62—front caster
64—upright frame member
66—lower frame member
68—brake actuator assembly
70—brake cable
72—brake support shaft
74—brake mount
76—brake link
78—brake link
80—brake handle
82—core wire clamp
84—wheel spoke
86—bearing gap
88—bearing spacer
90—brake drum support hub
92—wheel spoke web
94—transverse drum engaging grooves
96—inner bearing
98—outer bearing
100—main support tube
102—main support shaft bore
104—brake plate spacer
106—outer tool access cavity
108—support plate shoulder
110—head-brake cam
112—anti-rotation tab
114—anti-rotation tab
116—inner wheel bearing cavity
118—outer wheel bearing cavity

DETAILED DESCRIPTION OF THE INVENTION

Figure 1:
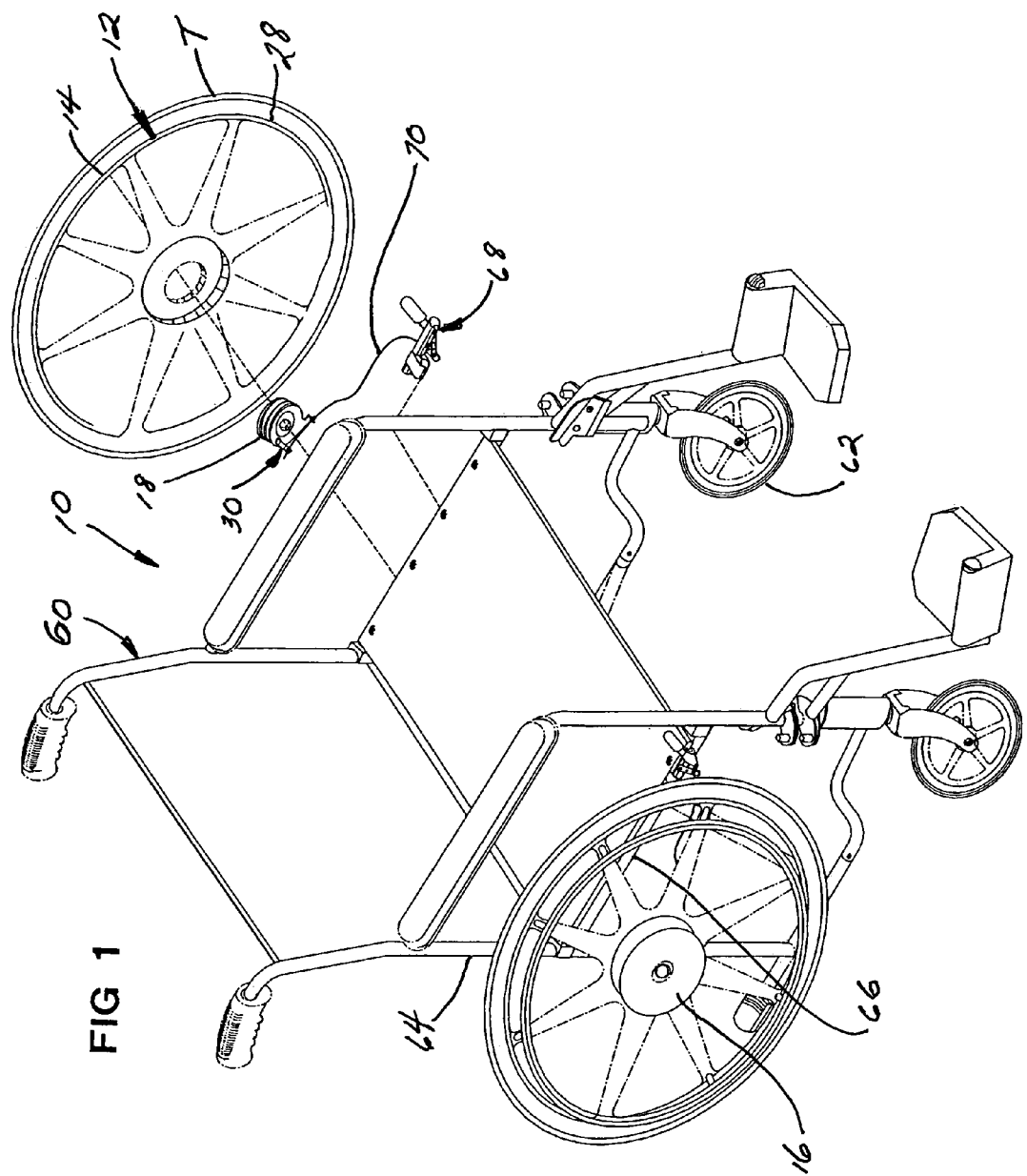
FIG. 1 is a perspective view of a typical wheelchair showing the improved braking support wheel therewith.

Referring now to the drawings, a partially exploded view of one embodiment of a wheelchair of the present shown generally at numeral 10 in FIG. 1. This embodiment 10 includes a larger rear braking and support wheel assembly shown generally at numeral 12 forming the larger-in-diameter spaced rear wheels 14 of this wheelchair assembly 10 and conventional front casters 62 supporting the front portion of the frame assembly 60. The frame assembly 60 includes spaced upright frame members 64 and spaced horizontal frame members 66 as shown.

The hub 16 of each molded one-piece braking support wheel 14 operably receives a brake assembly 30 which, for the purpose of clarity, is shown installed into the brake drum 18, the brake drum 18 being permanently molded into the hub 16 as a unit with the braking support wheel 14 as will be described herebelow. A brake actuator assembly 68 is clampingly engaged onto the spaced horizontal frame members 66 in a conventional manner. A flexible brake cable 70 interconnects the brake actuator assembly 68 and the brake mechanism 30 as will be described more fully herebelow. The molded braking support wheel 14 includes an outer tire-receiving rim 28 which supportively receives a tire T in a conventional manner.

Figure 2:
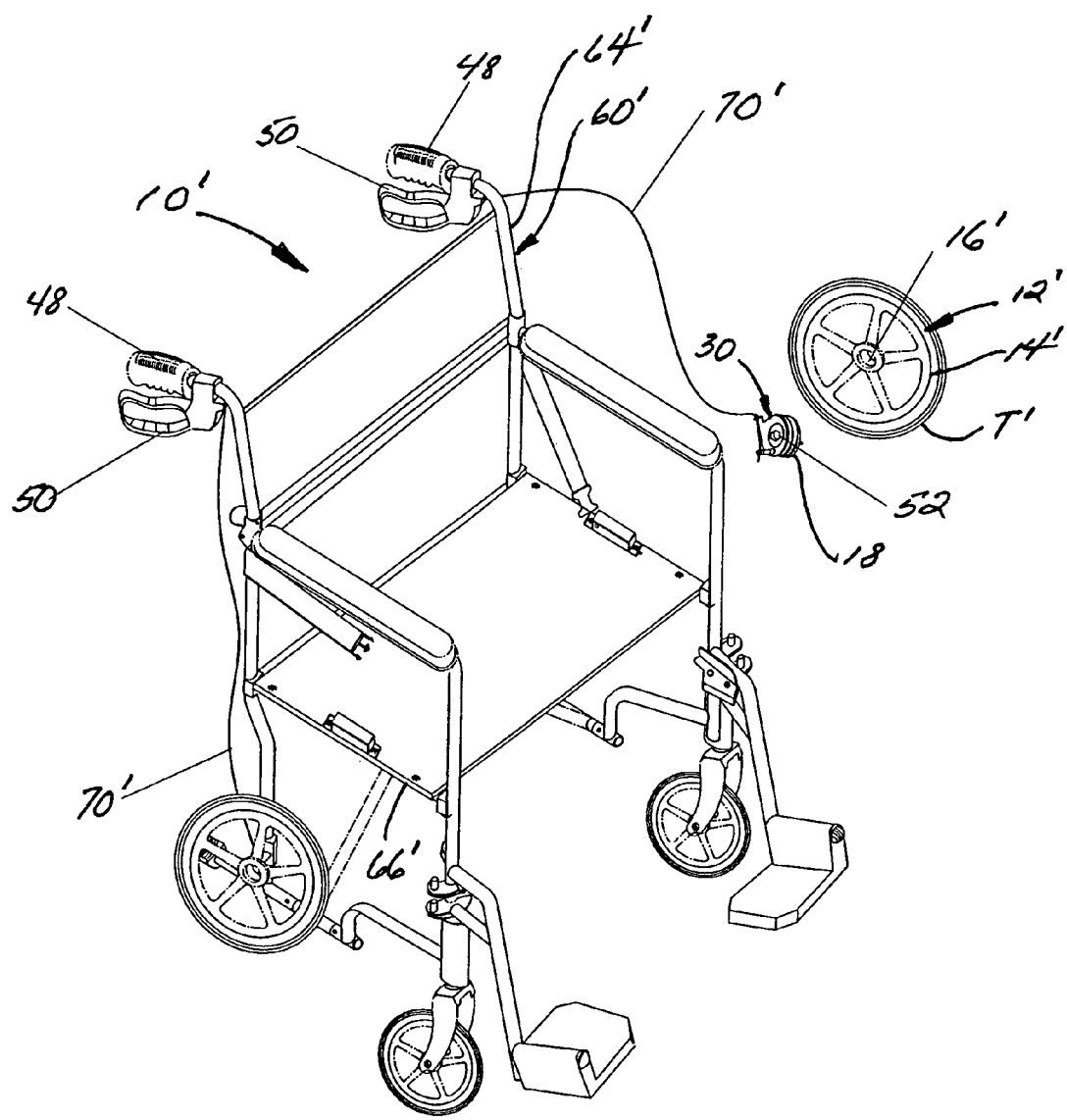
FIG. 2 is a perspective view of another wheelchair showing the improved braking support wheel therewith.
Figure 2A:
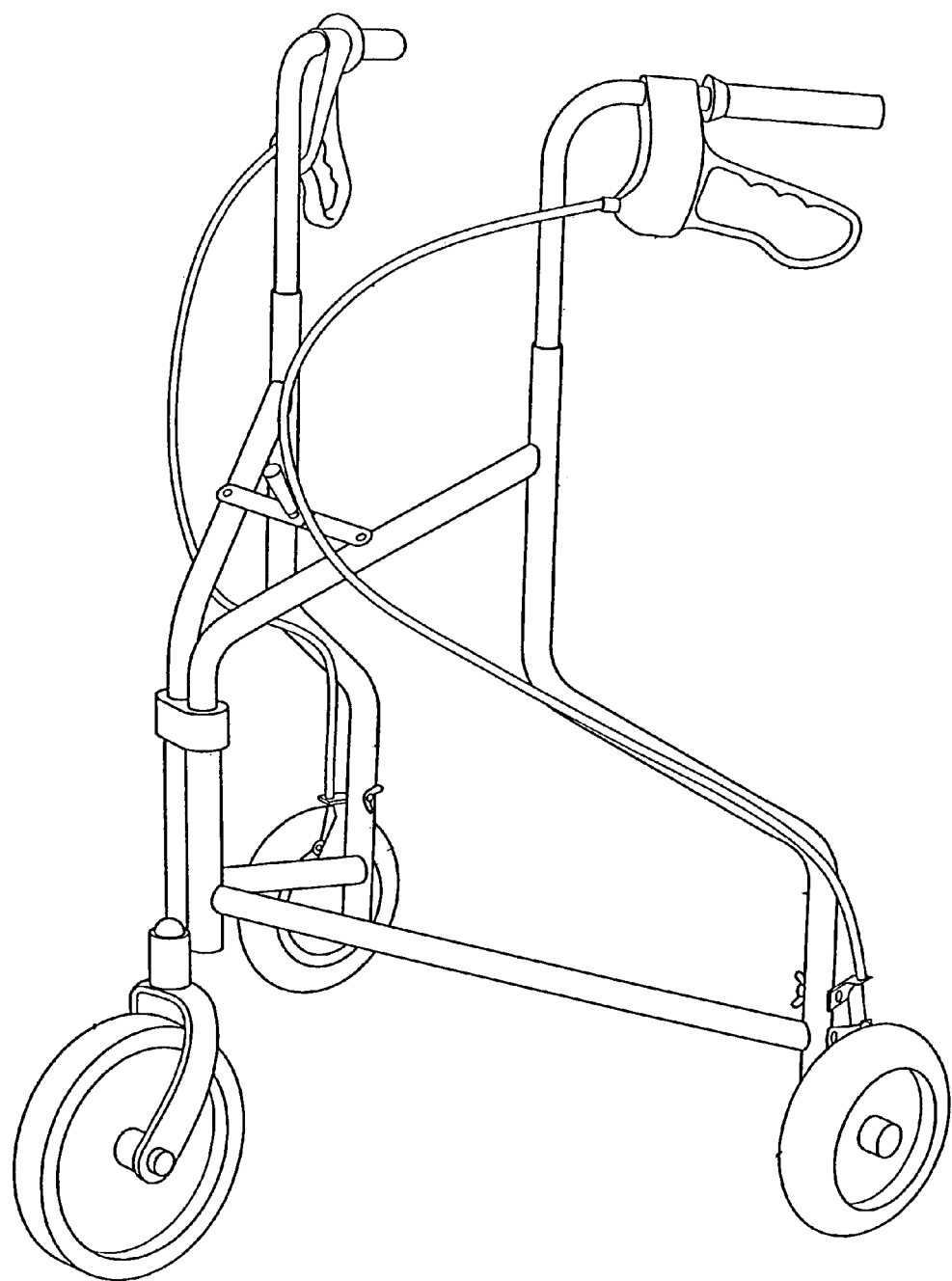
FIG. 2A is a perspective view of another invention embodiment in the form of a folding 3-wheeled rollator including the improved wheel braking mechanism of the present invention.

Referring now to FIG. 2, an alternate embodiment of the wheelchair frame assembly 60' is there shown at 10'. The wheelchair frame assembly 60' includes spaced horizontal frame members 66' upright frame members 64' having rearwardly, upwardly extending portions thereof which receive hand grips 48 and brake actuator levers 50. The brake actuator levers 50 are operably connected by flexible brake cable 70' to the brake assembly 30. Each smaller braking support wheel assembly 12' includes a smaller-in-diameter braking support wheel 14' supporting a tire T' of a generally smaller diameter than that shown in FIG. 1. The hub configuration 16' includes a molded-in brake drum 18 supporting the brake assembly 30 as previously described.

Figure 3:
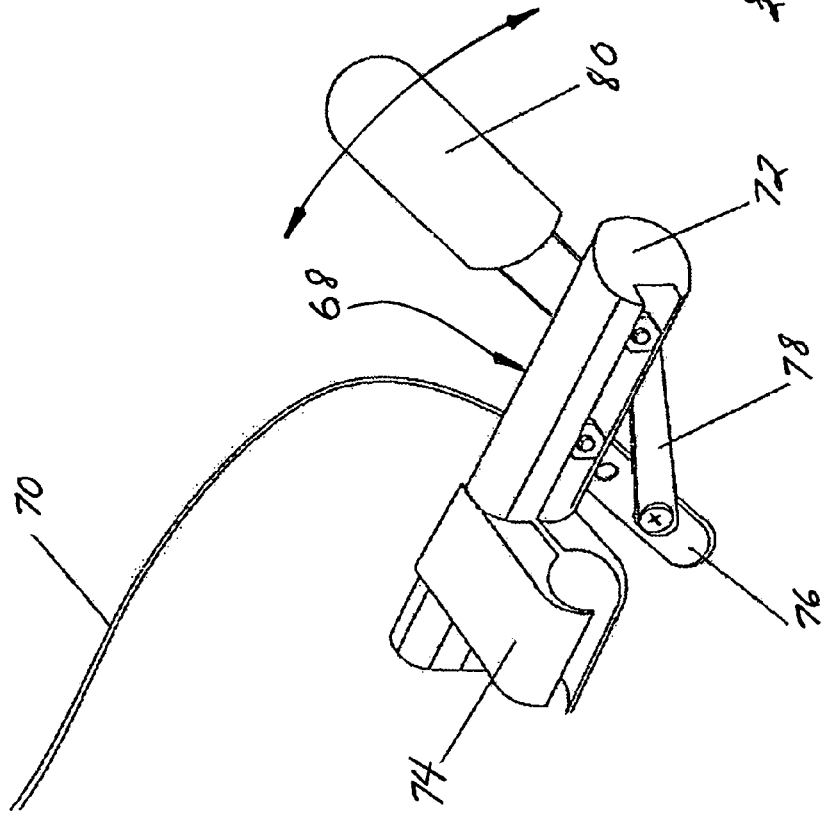
FIG. 3 is a perspective view of one embodiment of a brake actuator assembly ready for clamping engagement to either of the frame assemblies of FIGS. 1 and 2.

In FIG. 3, details of the brake actuator assembly 68 include an elongated brake support shaft and clamp 74 which serves to clampingly engage the brake actuator assembly 68 to the upper horizontal seat frame member 66 shown in FIG. 1. Brake links 76 and 78 pivotally connected together as shown respond to pivotal movement of the brake handle 80 in the direction of the arrows to actuate the brake cable 70.

Figure 4:
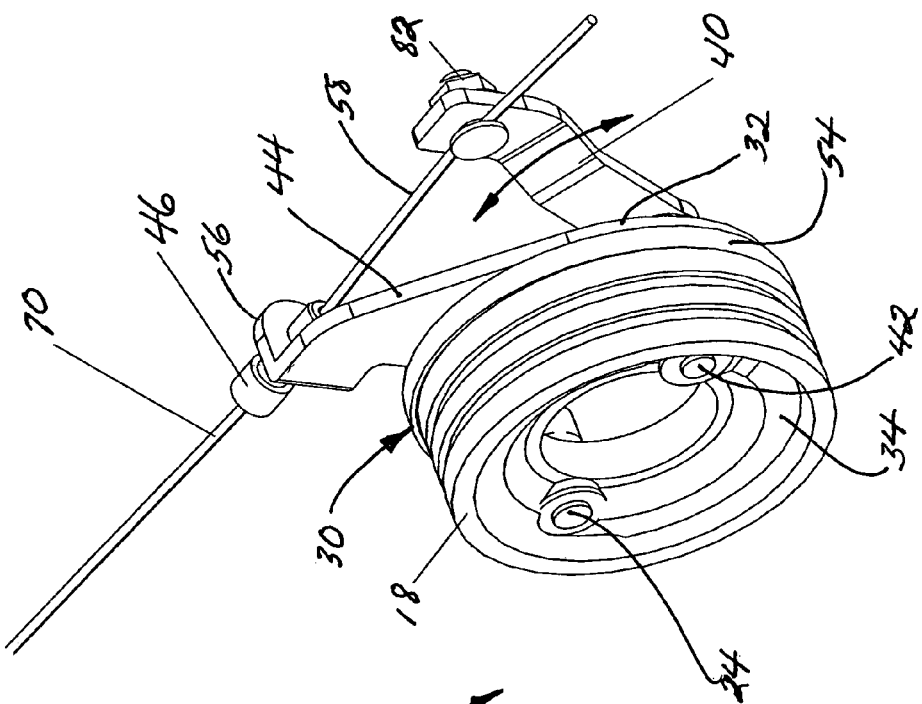
FIG. 4 is a perspective view of the brake assembly and including the brake drum for clarity.
Figure 5:
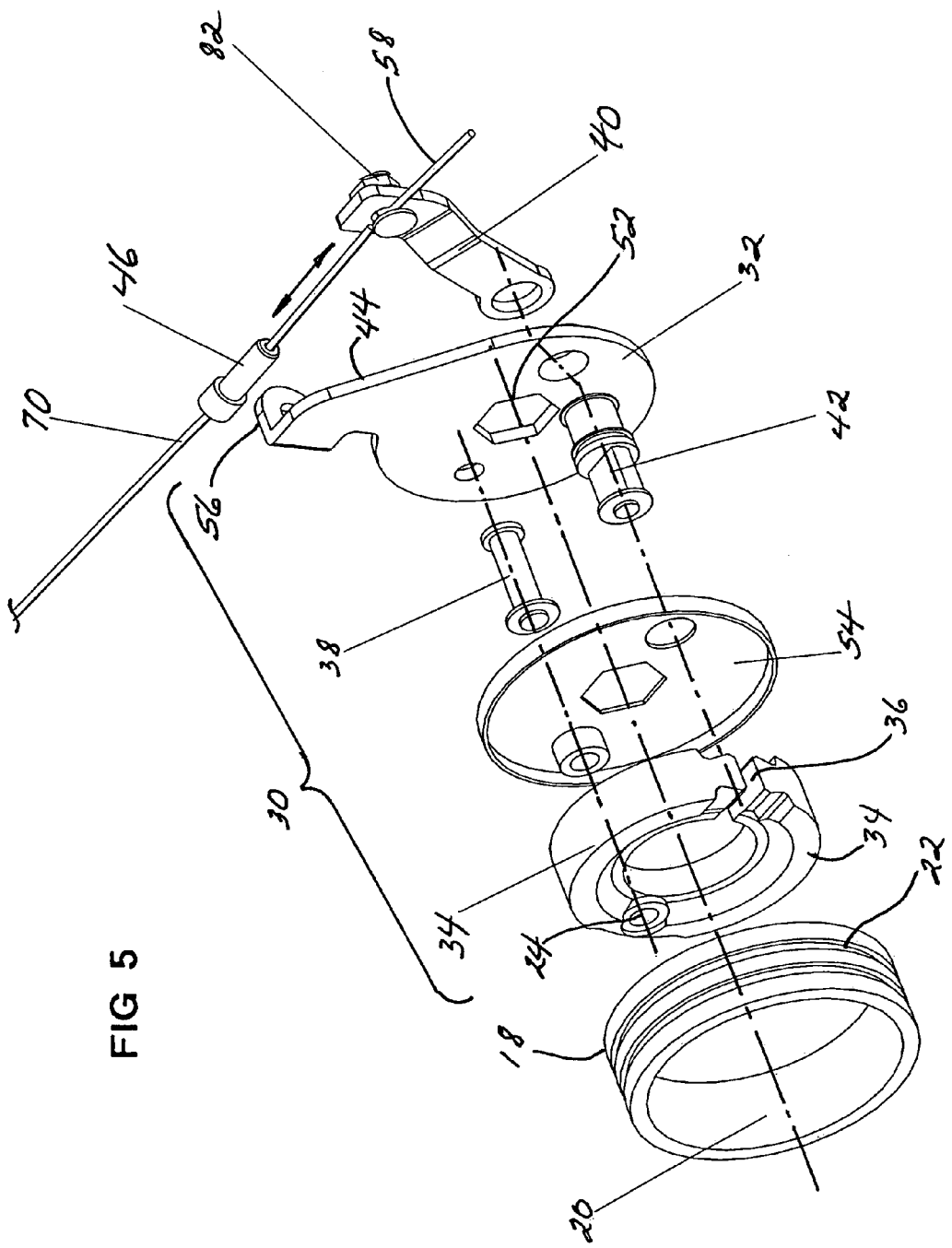
FIG. 5 is an exploded perspective view of FIG. 4.

In FIGS. 4 and 5, the opposite end of cable 70 is attached to an adjuster support flange 56 of the support arm 44 of a brake support plate 32 of the brake assembly 30. A threaded adjuster 46 receives the end of the outer sleeve of the brake cable 70, while the core wire 58 extends to be clampingly engaged by a core wire clamp 82 to adjacent the distal end of a pivotally movable motion transfer arm 40. The brake assembly 30 further includes a debris flange 54 mounted against the inner surface of the brake support plate 32. The opposing brake friction shoes 34 are mounted against the debris flange 54 in pivotal position about a brake shoe support shaft 38 through a common aligned pivotal aperture 24 in a proximal opposingly positioned end of each brake friction shoe 34.

Figure 6:
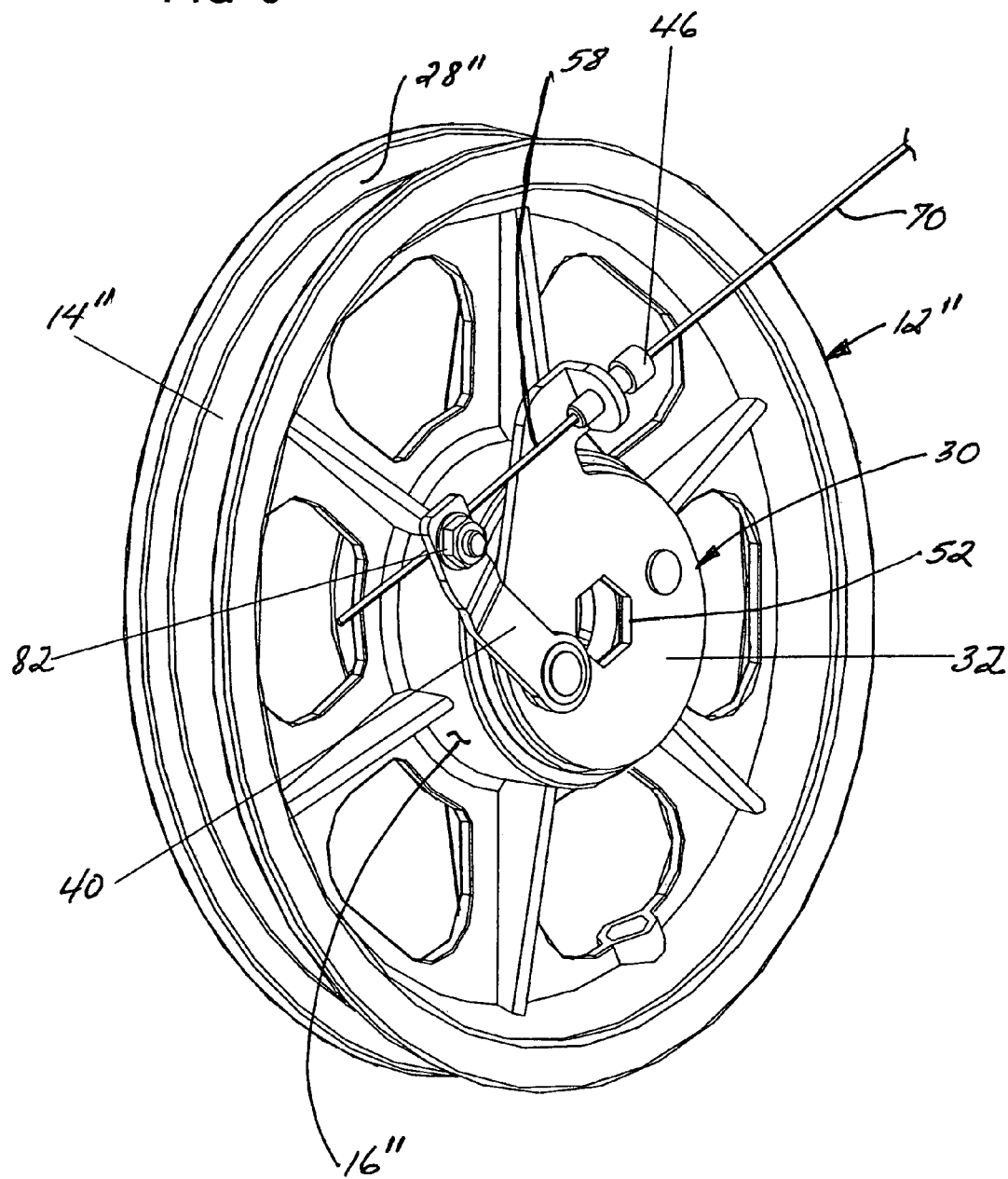
FIG. 6 is a perspective view of a smaller embodiment of the braking wheel and braking assembly connected together.

The motion transfer arm 40 is operably engaged with a brake cam 42 which rotates consonant with pivotal movement of the motion transfer arm 40 as effected by in and out movement of the core wire 58 in the direction of the arrow. This brake cam 42 includes opposing flats which are held biasingly by a wire spring (not shown) against brake shoe actuator surfaces 36 of the opposing spaced ends of each of the brake friction shoes 34. Thus, as the brake cam 42 is rotated, the brake shoes 34 are pivotally spread apart to act against the inner cylindrical drum friction surface 20 of the brake drum 18. Referring additionally to FIG. 6, a hexagonal brake plate anti-rotation aperture 52 is operably engaged with a mating surface of either an upright frame member 64 or a hexagonal surface formed onto a wheel mounting shaft (not shown) to resist the rotational torque exerted against the brake support plate 32 during braking operation.

Figure 9:
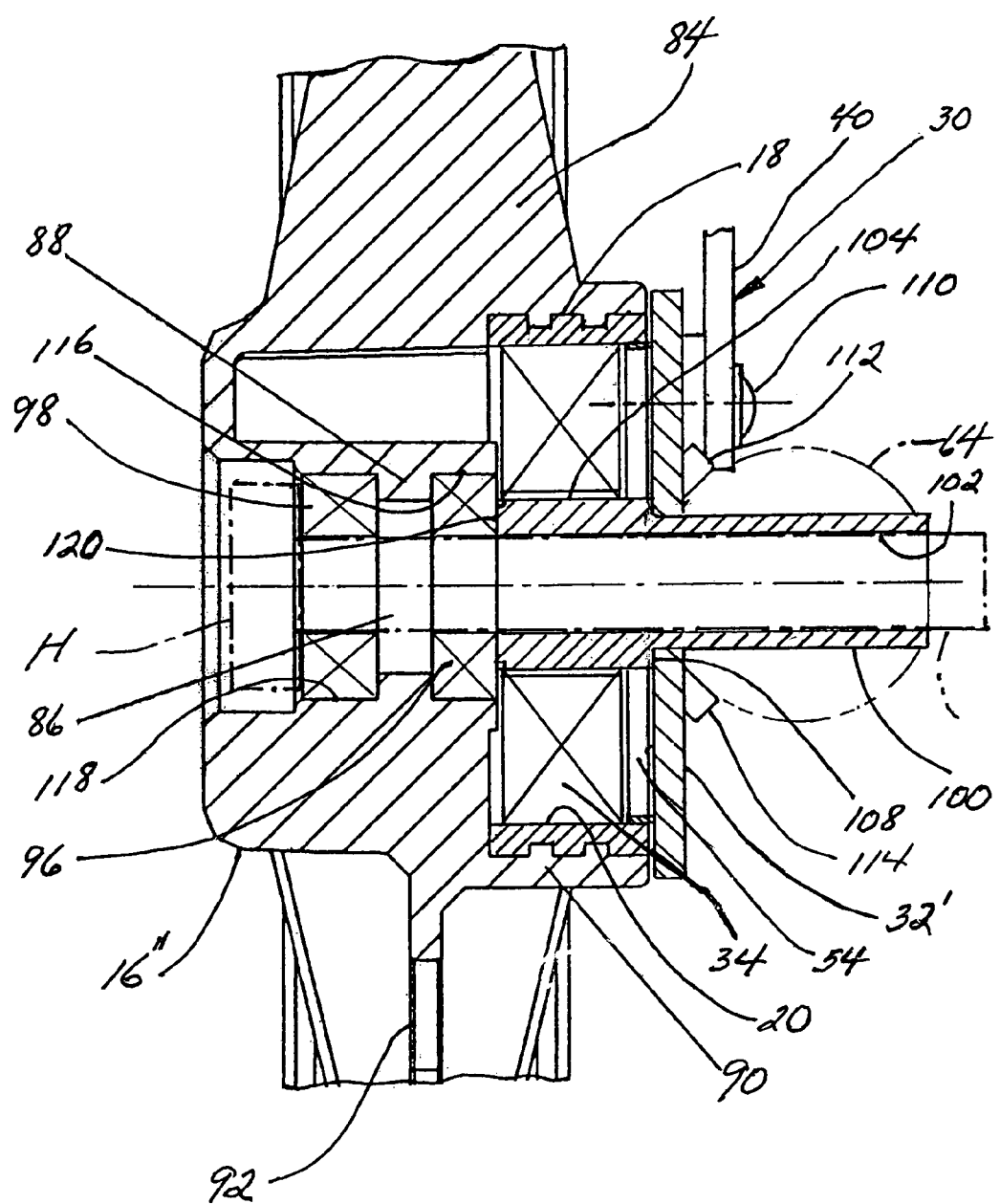
FIG. 9 is an enlarged view of the central hub area of FIG. 8, also showing the brake assembly and wheel bearings installed therein.

Referring now to FIGS. 7, 8 and 9, a most important aspect of the invention is there shown. In FIGS. 7 and 8, the injection-molded plastic or plastic-like braking support wheel 14" is formed as a unit of injection-molded plastic or plastic-like materials. This braking support wheel 14", as does the braking support wheels 14 and 14' which is identical except with respect to outside diameter of the rim 28, 28' and 28", includes radially extending evenly spaced wheel spokes 84 which tie the hub 16" and rim 28" together structurally. Lightening wheel spoke webs 92 form lightening apertures shown to both enhance strength while maintaining a low total weight of the braking support wheel 14".

Molded into and as a part of the hub 16" is the rigid metal brake drum or band 18 formed typically of steel for strength and wear resistance. However, other metallic materials are equally suitable for this purpose. The brake drum 18 includes annular grooved plastic-interlocking outer surface 22 of sufficient width so that the plastic material fully engages into this grooved outer surface 22 during the mold-forming of the braking support wheel 14". This grooved outer surface 22 insures that there is no movement between the brake drum 18 and the hub 16" during operation of the wheelchair, including the braking thereof as previously described.

The hub 16" includes concentrically and coaxially formed inner and outer wheel bearing cavities 116 and 118 which, as seen in FIG. 9, forcibly receive the inner and outer wheel bearings 96 and 98, respectively. These wheel bearings 96 and 98 are press fit and held spaced apart for added strength by an inwardly extending molded bearing spacer 88 forming the bearing gap 86. The hub 16" also includes an assembly clearance or access cavity 106 so that a conventional socket wrench may be utilized to install and remove the wheel support shaft S by its head H (shown in FIG. 10 in phantom).

To add strength to the hub 16", hub ribs 26 are provided which are evenly spaced and radially extending and which substantially stiffen the entire hub 16" while maintaining a minimum weight of molded plastic material to accomplish the necessary task of supporting the inner and outer wheel bearings 96 and 98 and brake drum 18 as previously described.

Referring particularly to FIG. 9, details of the brake mechanism 30 are there shown in section view positioned within the brake drum 18 with the brake friction shoes 34 bearing against the drum friction surface 20 to effect braking as previously described. An elongated main support tube 100 having an elongated longitudinal main support shaft bore 102 is positioned centrally within the brake assembly 30 with an enlarged end portion 104 forming a brake plate spacer between the inner bearing 96 against end surface 120 and support tube shoulder 108 against the brake support plate 32. With the wheel mounting shaft S slidably engaged through the inner bores of bearings 86 and 86 and the main support shaft bore 102, securement of this arrangement into a suitable aperture or receiver formed through the upright frame member 64 (shown in phantom), of frame assembly 60 is effected.

Still referring to FIG. 9, an alternate means for preventing rotation of the brake support plate 32' is in the form of anti-rotation tabs 112 and 114 formed integrally with the brake support plate 32'. These tabs 112 and 114 are angled and spaced apart so as to engage against the outer surface of the upright frame member 64 as shown. Preferably, two spaced upper and lower anti-rotation tab sets 112 and 114 are provided so that a set of four such tabs, two on either side of frame member 64, provide positive anti-rotation alignment of the brake support plate 32 and the entire brake assembly 30.

Figure 10:
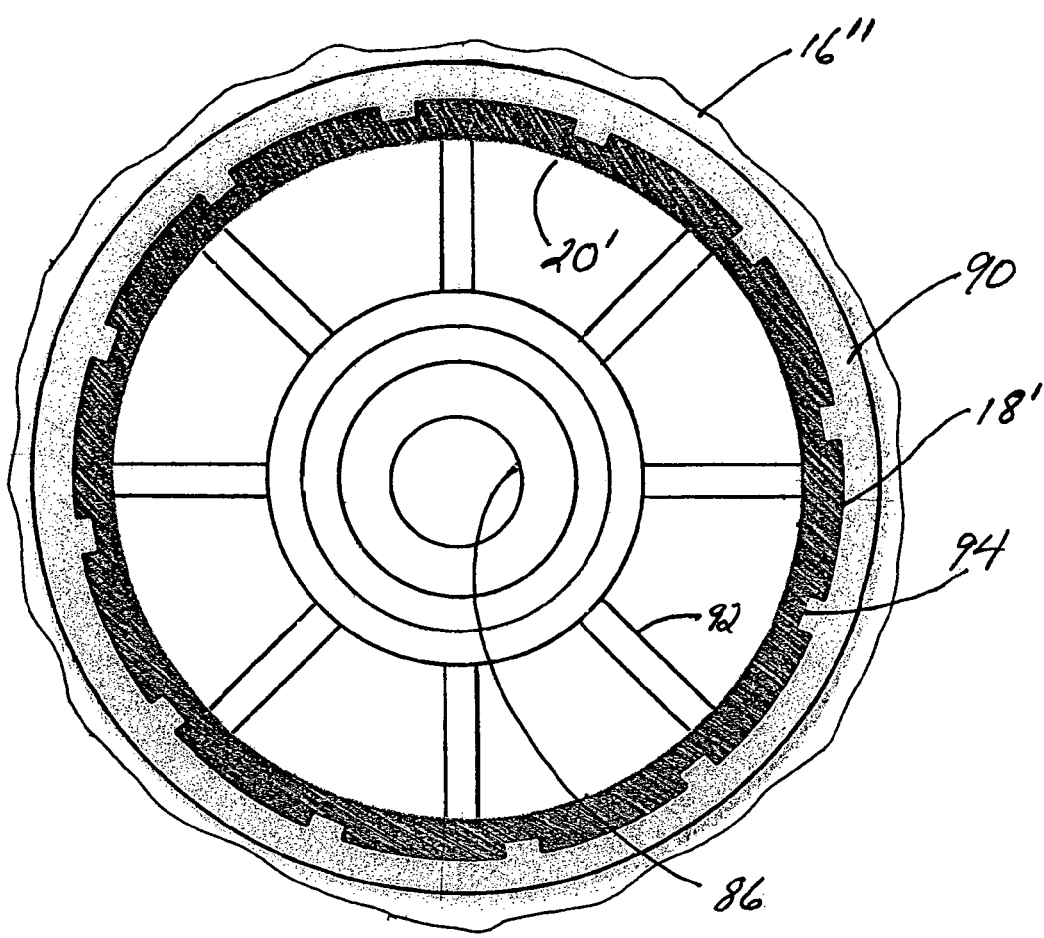
FIG. 10 is an enlarged side elevation view of the central hub area showing an alternate embodiment of the brake drum.

Referring lastly to FIG. 10, an alternate embodiment of the brake drum 18' is there shown. Molded into the hub 16' of the braking support wheel (not shown for simplicity) during the plastic injection mold forming thereof. This brake drum 18' includes the cylindrical drum friction surface 20' which operably engages against the outer surfaces of the brake friction shoes 34 as previously described. However, the outer surface of the brake drum 18' includes spaced apart transverse hub engaging grooves 94 which are better suited for resisting the torsional forces generated during braking operation of the wheelchair assembly. In this hub embodiment 16", the bearing gap 86 and brake drum support hub 90 are similar to those previously described in FIGS. 7, 8 and 10.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so s to embrace any and all equivalent apparatus and articles.

The invention claimed is:

1. A molded braking and support wheel for a multi-wheeled adaptive aid for use by a handicapped person comprising:

a support wheel molded as a single unit having a tire receiving rim, a wheel bearing and brake assembly receiving hub, and spaced wheel spokes substantially radially extending between said hub and said rim;

a ring-shaped rigid metal brake drum molded as a unit into said hub, said brake drum having an interlocking outer surface and a generally cylindrical inner braking friction surface, said interlocking outer surface molded into said hub to form a single unit with said support wheel to secure said brake drum from relative movement in said hub;

said brake drum defining a generally cylindrical cavity adapted to operatively receive a brake assembly;

said hub including a wheel-bearing cavity coaxial with said brake drum adapted to receive a wheel bearing positioned therein.

2. A molded braking and support wheel assembly for a multi-wheeled wheelchair for use by a handicapped person comprising:

a braking support wheel molded as a single unit of plastic or plastic-like material and having a tire receiving rim, a wheel bearing and brake assembly receiving hub, and spaced wheel spokes substantially radially extending between said hub and said rim;

a ring-shaped rigid metal brake drum molded as a unit into said hub, said brake drum having a plastic-interlocking outer surface and a generally cylindrical inner braking friction surface, said plastic-interlocking outer surface molded into said hub forming a single unit with said support wheel to secure said brake drum from relative movement in said hub;

a brake assembly;

said brake drum defining a generally cylindrical cavity for operatively receiving said brake assembly mounted therein;

said hub including spaced wheel bearings mounted coaxially with said brake drum which are adapted to receive an elongated wheel assembly support shaft insertable therethrough and connectable to an upright frame member of the wheelchair.

3. A multi-wheeled wheelchair for a handicapped person comprising:

a wheelchair frame assembly;

a plurality of rotatable support wheels attached in spaced relation to and supporting said frame assembly, at least two of said support wheels including a braking and support wheel molded as a single unit having a tire receiving rim, a wheel bearing and brake assembly receiving hub, and spaced wheel spokes substantially radially extending between said hub and said rim;

a ring-shaped rigid metal brake drum molded as a unit into said hub, said brake drum having a plastic-interlocking outer surface and a generally cylindrical inner braking friction surface, said interlocking outer surface molded into said hub to form a single unit with said support wheel to secure said brake drum from relative movement in said hub;

a brake assembly;

said brake drum defining a generally cylindrical cavity for operatively receiving said brake assembly mounted therein;

said hub including spaced wheel bearings mounted coaxially with said brake drum and which receive an elongated wheel assembly support shaft inserted therethrough, said support shaft connected at an inner end thereof to said frame assembly.

4. In a multi-wheel chair for a handicapped person, said wheelchair including a wheelchair frame assembly and a plurality of rotatable support wheels attached in spaced relation to said frame assembly, the improvement comprising:

at least two of said support wheels molded as a single unit each of said support wheels also having a tire receiving rim, a wheel bearing and brake assembly receiving hub, and spaced wheel spokes substantially radially extending between said hub and said rim;

a ring-shaped rigid metal brake drum molded as a unit into said hub, said brake drum having a interlocking outer surface and a generally cylindrical inner braking friction surface, said interlocking outer surface molded into said hub to form a single unit with said support wheel to secure said brake drum from relative movement in said hub;

a brake shoe-type brake assembly;

said brake drum defining a generally cylindrical cavity for operatively receiving said brake assembly;

said hub including spaced wheel bearings mounted in a wheel-bearing cavity formed coaxially with said brake drum, said wheel bearings coaxially aligned to receive a wheel support shaft therethrough, an inner end of said support shaft connected to said frame assembly.

* * * * *